US009069583B2

(12) United States Patent
Hoff

(10) Patent No.: US 9,069,583 B2
(45) Date of Patent: Jun. 30, 2015

(54) DESIGNER EXTENSIBILITY

(75) Inventor: Phillip M. Hoff, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 758 days.

(21) Appl. No.: 12/894,181

(22) Filed: Sep. 30, 2010

(65) Prior Publication Data

US 2012/0084746 A1    Apr. 5, 2012

(51) Int. Cl.
*G06F 9/44* (2006.01)
*G06F 9/445* (2006.01)

(52) U.S. Cl.
CPC .................................. *G06F 9/44526* (2013.01)

(58) Field of Classification Search
None
See application file for complete search history.

(56) References Cited

U.S. PATENT DOCUMENTS

| 7,464,366 | B2 * | 12/2008 | Shukla et al. ................. 717/100 |
| 7,676,785 | B2 | 3/2010 | Loksh et al. |
| 2008/0092057 | A1 | 4/2008 | Monson et al. |

OTHER PUBLICATIONS

Dphill, "Prism and MEF—David Hill's WebLog—Site Home—MSDN Blogs", Retrieved at << http://blogs.msdn.com/b/dphill/archive/2009/12/09/prism-and-mef.aspx >>, Dec. 9, 2009, pp. 2.

Bustamante, Michele Leroux, "WF Scenarios Guidance: SharePoint and Workflow", Retrieved at << http://msdn.microsoft.com/en-us/library/cc748597.aspx >>, May 2008, pp. 30.
"Integrating Reporting Services into Your Application", Retrieved at << http://msdn.microsoft.com/en-us/library/aa964126%28SQL.90%29.aspx >>, Nov. 2005, pp. 11.
"Inside the Visual Studio SDK", Retrieved at << http://msdn.microsoft.com/en-us/library/cc138569.aspx >>, Aug. 9, 2010, pp. 5.
"The New Iteration : How XAML Transforms the Collaboration Between Designers and Developers in Windows Presentation Foundation", Retrieved at << http://windowsclient.net/wpf/white-papers/thenewiteration.aspx >>, Aug. 9, 2010, pp. 18.
"Integration with Office SharePoint Server 2007", Retrieved at << http://msdn.microsoft.com/en-us/library/ms454209%28office.12%29.aspx >>, Aug. 9, 2010, pp. 5.
"Managed Extensibility Framework—Discussions", Retrieved at << http://mef.codeplex.com/Thread/List.aspx?ViewAll=true >>, Aug. 9, 2010, pp. 55.

* cited by examiner

*Primary Examiner* — Qamrun Nahar
(74) *Attorney, Agent, or Firm* — Kevin Sullivan; Kate Drakos; Micky Minhas

(57) ABSTRACT

Aspects of the subject matter described herein relate to designer extensibility. In aspects, a designer package is registered. The designer package includes a component that is able to search for designers that support a given file. After finding one or more designers that support a file, the component creates a control that includes the one or more designers. The component may also include in the control an editor usable to view a text-based representation of the file. After creating the control, the component may return a reference to the control that may be used to host the control. The mechanism also supports finding and creating controls that are not based on files.

20 Claims, 6 Drawing Sheets

DESIGNER EXTENSIBILITY

BACKGROUND

Some software development tools allow a software developer to extend the software development tool. In this way, the software developer is able to customize the tool in ways beneficial to the software developer's use of the tool. Unfortunately, extending a software development tool via an extension mechanism is often so complicated, time consuming, or otherwise challenging that software developers ignore the extension mechanism or choose not to extend the tool.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to designer extensibility. In aspects, a designer package is registered. The designer package includes a component that is able to search for designers that support a given file. After finding one or more designers that support a file, the component creates a control that includes the one or more designers. The component may also include in the control an editor usable to view a text-based representation of the file. After creating the control, the component may return a reference to the control that may be used to host the control. The mechanism also supports finding and creating controls that are not based on files.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
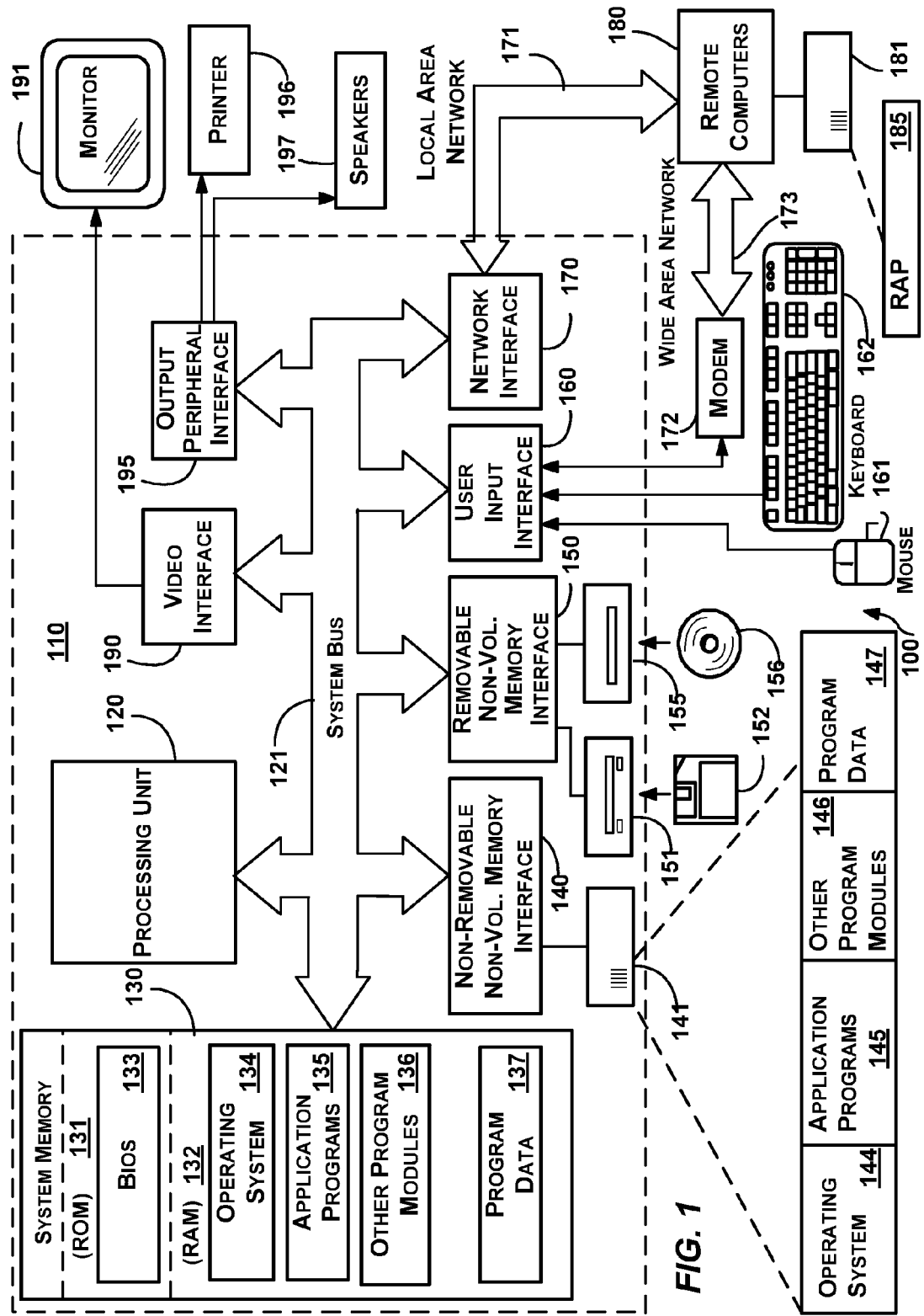
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Extensions

As mentioned previously, extending a software development tool through an extension mechanism is often so complicated, time consuming, or otherwise challenging that software developers ignore the extension mechanism or choose not to extend the tool.

Figure 2:
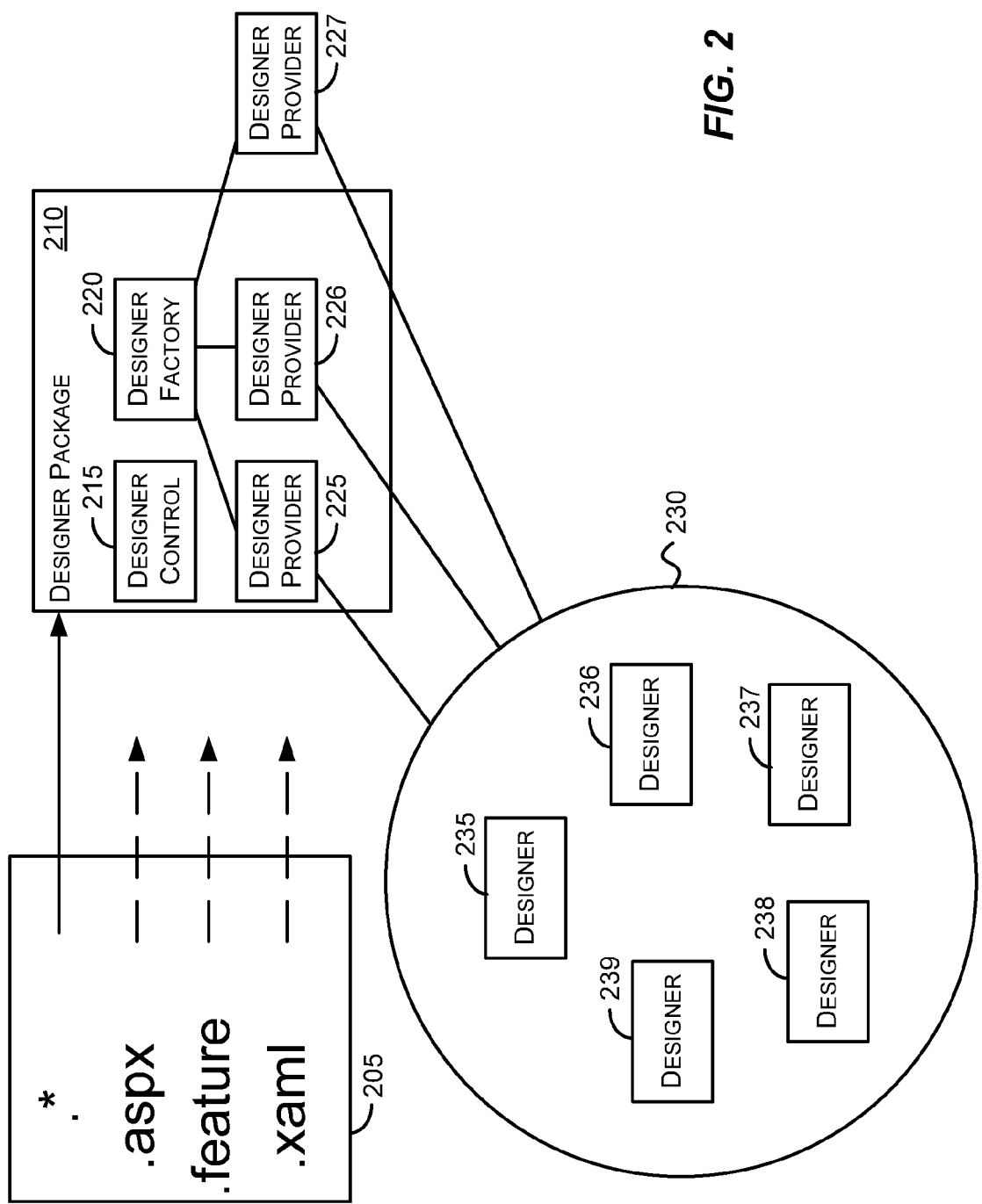
FIG. 2 is a block diagram that represents exemplary components in accordance with aspects of the subject matter described herein.

FIG. 2 is a block diagram that represents exemplary components in accordance with aspects of the subject matter described herein. The components illustrated in FIG. 2 are exemplary and are not meant to be all-inclusive of components that may be needed or included in an implementation. In other embodiments, one or more of the components described in conjunction with FIG. 2 may be included in other components (shown or not shown) or divided into other components without departing from the spirit or scope of aspects of the subject matter described herein. In some embodiments, the components described in conjunction with FIG. 2 may be distributed across multiple devices.

The components may include a registry 205, a designer package 210, a designer repository 230, and may include other components. In one embodiment, one or more designers may be included in the designer package 210 in addition to, or in lieu of, the designers included in the designer repository 230. In another embodiment, one or more designer providers may be included in the designer repository 230 or another repository. The various components may be located relatively close to each other or may be distributed across the world.

The components may be implemented using one or more computers (e.g., the computer 110 of FIG. 1). The various components may be reachable via various networks including intra- and inter-office networks, one or more local area networks, wide area networks, direct connections, virtual connections, private networks, virtual private networks, some combination of the above, and the like.

The registry 205 and the designer repository 230 may be stored on one or more stores. A store may comprise hard disk storage, solid state, or other non-volatile storage, volatile memory such as RAM, other storage previously described in conjunction with FIG. 1, some combination of the above, and the like and may be distributed across multiple devices. A store may be external, internal, or include components that are both internal and external to one or more devices that implement the components of FIG. 2.

The components of FIG. 2 may be part of a software development tool (sometimes referred to simply as a development tool). A development tool may be used to develop and/or deploy software. In one exemplary embodiment, a development tool may include an integrated development environment (IDE) that allows a software developer to design and manipulate user interface elements, including, for example, controls, buttons, menus, charts, text boxes, list boxes, combo boxes, other boxes, panes, and the like, to enter and update code, debug code, create and update databases, associate the code with one or more databases, compile the code, create a package, do other actions, and the like.

In operation, a designer package (e.g., the designer package 210) may be registered with the development tool. This registration configures the development tool to call a designer factory (e.g., the designer factory 220) of the designer package (e.g., the designer package 210) to request a designer. The registration may register the designer package with a wild card extension (e.g., "*") or some similar mechanism that associates the designer package with one or more files. This wild card extension registers the designer package with any and all file extensions.

When the development tool receives a registration request with a wild card extension, the development tool may store an association between the designer package and all extensions in the registry 205. Afterwards, a user may select a file to open. In response, the development tool may retrieve the association from the registry and call the designer factory associated with the extension of the file. The designer factory 220 is responsible for returning a control that includes one or more designers that support the indicated file.

By registering a wild card extension for a designer package, a designer factory may be called for every file. The registration may be prioritized so that the designer factory is called before other designer factories, if any. If the designer factory is not able to find a designer that supports the indicated file, the designer factory may return a code to the development tool that indicates that the designer factory cannot find a designer. In response, the development tool may attempt to find a designer using other associations included in the registry.

When the designer factory 220 is called, it may be passed a reference (e.g., a file handle, name, or the like) to the file. In response, the designer factory 220 may search for one or more designers that support the indicated file. A designer is said to "support" a file if the designer is capable of reading, writing, and/or using data formatted according to the format of the file and providing a control usable to graphically or textually manipulate elements of the file. For example, a designer may support an XML file having a given namespace if the designer is capable of presenting a design surface that shows user interface elements that represent corresponding elements found in the data of the file.

The designer factory 220 may use one or more designer providers (e.g., the designer providers 225-227) to search for a designer that supports an indicated file. These designer providers may be registered with the development tool (and may include designer providers outside of the designer package 210). In obtaining the designer providers, the designer factory 220 may request a collection of designer providers registered with the software development tool.

The designer factory 220 may then query each designer provider for a collection of designers that support the indicated file. A designer provider may in turn search the designer repository 230 for designers that support the indicated file.

To search the designer repository 230, a designer provider may use metadata associated with the designers 235-239. The metadata may include, for example, a file extension, namespace, file content, other data, and the like that a designer supports. A designer provider may match any part or all of the metadata to determine whether a designer supports a given file.

A designer provider may be tailored to search for a particular type of designer. For example, the designer provider 225 may search for designers based on a given file extension, the designer provider 226 may search for designers based on a given namespace (e.g., an XML or other namespace), and the designer provider 227 may search for designers based on file content.

Each designer provider may be operable to return to the designer factory 220 zero or more designers that support a given file. After receiving one or more designers that support a given file, the designer factory 220 may create a control that includes the one or more designers. In one embodiment, each designer in the control may be associated with a tab element where the tab element is operable to receive a command to switch to the designer associated with the tab element.

Figure 4:
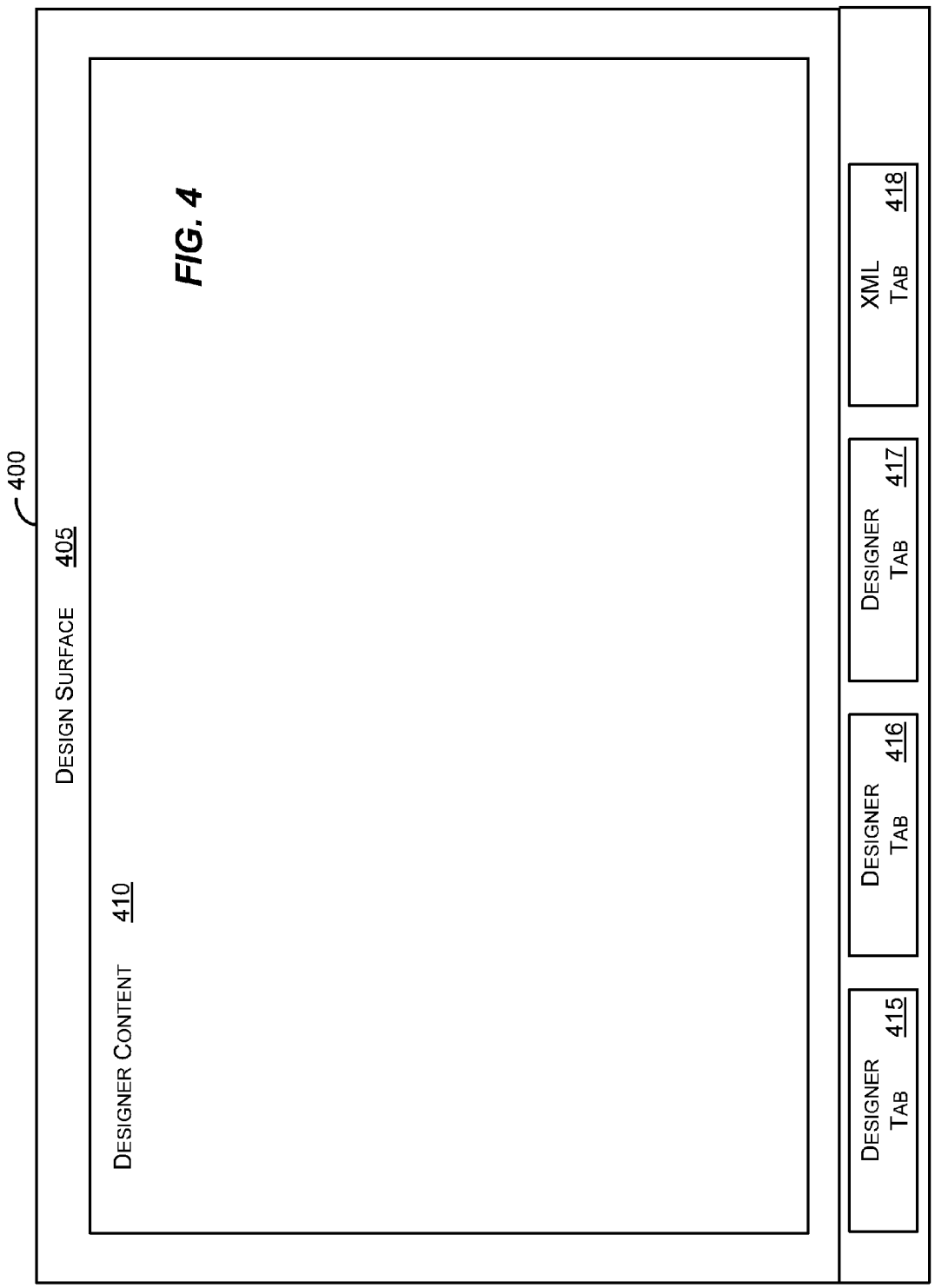
FIG. 4 is a block diagram that generally represents an exemplary user interface of a control provided by a designer factory in accordance with aspects of the subject matter described herein.

The term tab element is intended to cover various user interface elements by which navigation between designers may be accomplished. For example, in one embodiment, a tab element may include a button as shown in FIG. 4. In another embodiment, a tab element may include a hyperlink that causes navigation to a new page that includes a designer. In yet another embodiment, a tab element may include a menu item or other control that allows navigations between designers. In yet another embodiment, a tab element may include an interface that captures finger movements to navigate between designers. In yet another embodiment, a tab element may include a voice interface that allows navigation between designers. In one sense, a tab element is any mechanism however called that allows a user to navigate between designers.

The examples above are not intended to be all-inclusive or exhaustive. Based on the teachings herein, those skilled in the art may recognize other tab elements that may also be employed without departing from the spirit or scope of aspects of the subject matter described herein.

The designer factory 220 may also include an additional tab element in the control. This additional tab element may be associated with, for example, a markup language (e.g., XML, HTML, or some other markup language) or other text editor that allows editing markup language and/or text of the file (rather than through a designer that represents elements graphically).

FIG. 4 is a block diagram that generally represents an exemplary user interface of a control provided by a designer factory in accordance with aspects of the subject matter described herein. In this example, the designer factory has found three designers that support a particular file. In addition, the designer factory has also created a markup language tab to be able to view the XML code of the file.

The control includes a designer surface 405 which includes designer content 410 that corresponds to the active one of the tab elements 415-418. A software developer may switch between designers by clicking on one of the tab elements 415-417. The software developer may view markup language associated with a file by clicking on the XML tab 418.

Returning to FIG. 2, in addition to placing the designers in the control, the designer factory 220 may also load a buffer with content of the indicated file and provide a reference (e.g., a pointer, handle, or the like) to the buffer to the one or more designers included in the control. In one embodiment, the designer factory 220 may load the content of the indicated file into a component that presents the buffer via a model of a markup language. This component may be operable, for example, to maintain content of the buffer in a manner that is well-formed for the markup language. Well-formed means that at any given time—even during editing—the component may return text that follows all the syntactic rules of the given language.

The component may also be operable to return raw text from the buffer. In this manner, a designer may be able to access not only the model but the raw text as desired.

After creating the component that includes the one or more designers, the designer factory 220 may provide a reference (e.g., pointer, handle, or the like) to the control (e.g., the designer control 215) to the development tool. The development tool may then use the reference to host the control in a window of the development tool.

The teachings herein may also be applied to tool windows. A tool window may be used, for example, to host tool buttons and other user interface elements useful in software development. A tool window may not be associated with a type of file (or any file at all). A tool window, however, may be associated with other metadata (such as an identifier) that can be used to find the tool window in a designer repository in response to some user action (e.g., menu item selection, toolbar button press, or some other action). Once the appropriate tool window is located (e.g., by a tool window factory or the like), it can be instantiated and displayed in a window of the software development tool.

The teachings herein may also be applied to designers that are bound to items of a project system rather than to particular files. For example, a development platform may allow users to extend the items supported by a project. A software developer may desire to have a designer for a new or existing item. To associate a designer with an item, the developer may create a binder and provide an identifier of the item and an identifier of the designer.

In exemplary environments, there may be a collection of binders where each binder associates a designer with an item. When a software development tool loads or otherwise interacts with a project in such an environment, an extension of the software development tool may search the collection of binders and find a binder that associates a designer with an item currently loaded in the software development tool. The extension may then configure a user interface element (e.g., a representation of the item, context menu associated with the item, or the like) of software development tool to provide an indication to open the designer in response to input (e.g., double clicking on the item, right-clicking on the item, selecting the item, or the like) regarding the element. The extension may do this for each binder that associates an item currently loaded in the software development tool In response to an indication provided by the user interface element, a designer factory may construct a control that includes the designer and return a reference to the control to the software development tool which may then host the control in a window, for example.

Figure 3:
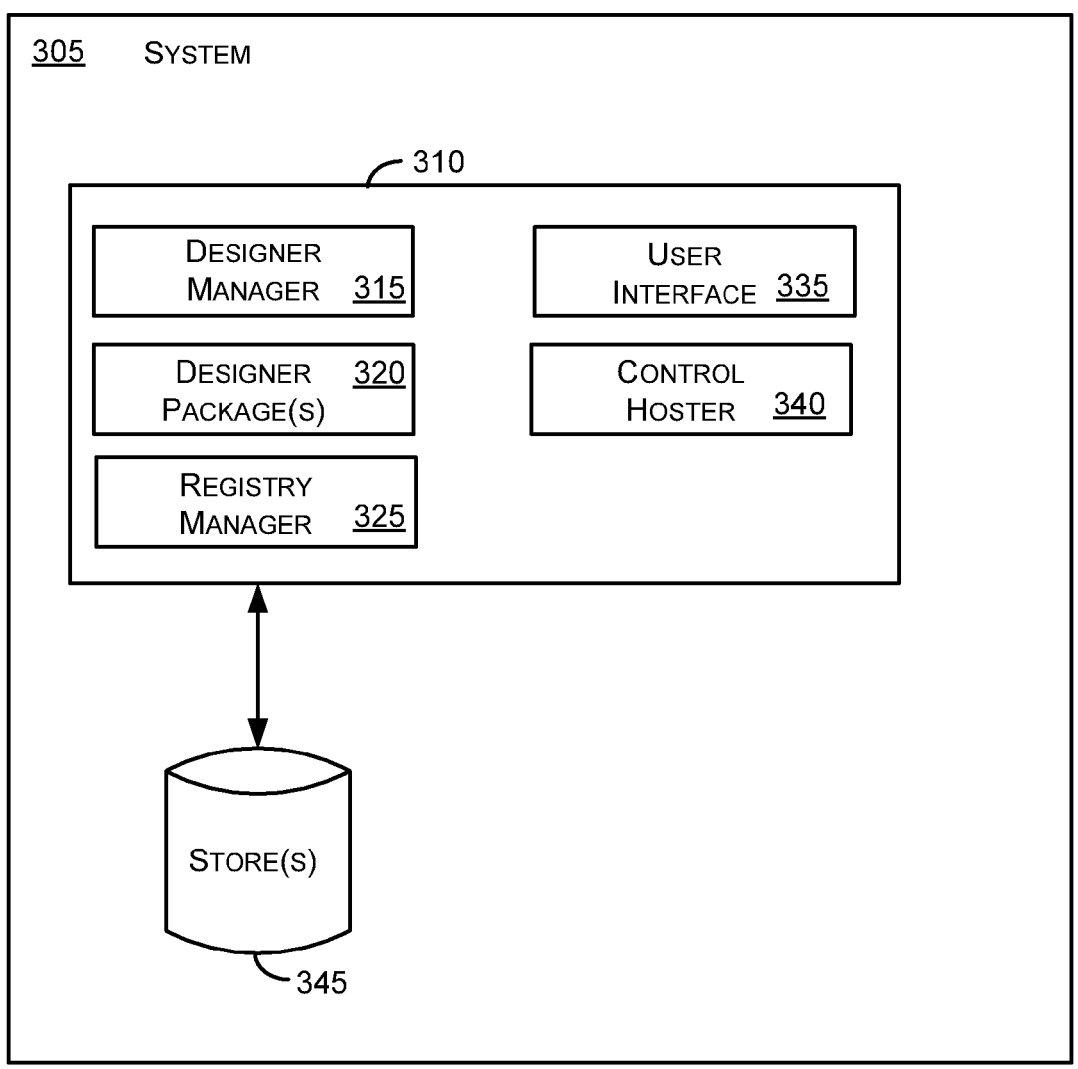
FIG. 3 is a block diagram that represents a system configured in accordance with aspects of the subject matter described herein.

FIG. 3 is a block diagram that represents a system configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the system 305 may include software development components 310, a store 345, and other components (not shown). The software development components 310 may include a designer manager 315, designer package(s) 320, a registry manager 325, a user interface 335, a control hoster 340, and other components (not shown). The system 305 may be implemented using one or more computers (e.g., the computer 110 of FIG. 1).

The store(s) 345 may include any storage media capable of storing data involved with software development. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store(s) 345 may comprise a file system, database, volatile memory such as RAM, other storage, some combination of the above, and the like and may be distributed across multiple devices. The store(s) 345 may be external, internal, or include components that are both internal and external to the system 305.

The store(s) 345 may include a registry (e.g., the registry 205 of FIG. 2) that includes one or more entries, where the entries associate file extensions with designer packages.

The designer package(s) 320 may include any designer package(s) that have been registered with the development tool. For example, the designer package(s) 320 may include the designer package 210 of FIG. 2. These designer package(s) may extend the software development tool to support designers not originally included in the software development tool.

A designer package may include a designer factory that references one or more design providers. These designer providers may be included in the package and/or outside the package. As mentioned previously, a designer provider is operable to determine one or more designers that support a file. As also mentioned previously, the designer factory of a designer package is operable to create a control that includes the one or more designers that support the file.

As also mentioned previously, the designer factory may include a tab element for each of the one or more designers that support a file. Each tab element may be operable to receive a command to switch to a designer associated with the tab element. The designer factory may also include an additional tab element associated with a markup language editor included in the control. The designer factory may be further operable to load a buffer (or component to expose a markup model) with content of the indicated file and to provide a reference to the buffer (or component) to the one or more designers included in the control.

The registry manager 325 is operable to receive an indication of the designer package together with an indication that the designer package is to be associated with all extensions. Where a registration includes a wild card registration, the registry manager 325 may be further operable to create an entry within the registry that associates a designer package with all extensions.

The designer manager 315 is operable to receive a request to edit an indicated file having an indicated extension. The designer manager 315 may then determine a designer package using the registry manager 325 and call the designer factory of the designer package to create the control that includes the one or more designers that support the indicated file.

The user interface component 335 provides a user interface by which a software developer may interact with the software development components including the returned control. The control hoster 340 may host a returned control in a window of the software development tool. In one embodiment, the control hoster 340 may be integrated with the user interface component 335.

Figure 5:
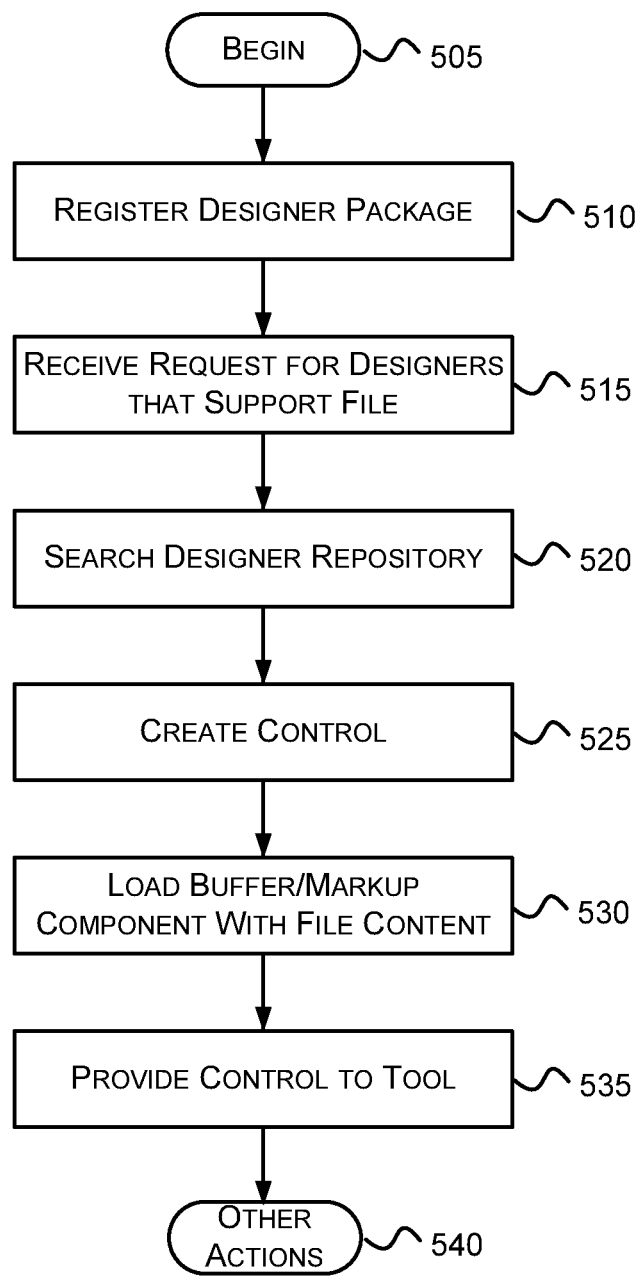
FIGS. 5-6 are flow diagrams that generally represent exemplary actions that may occur in accordance with aspects of the subject matter described herein.
Figure 6:
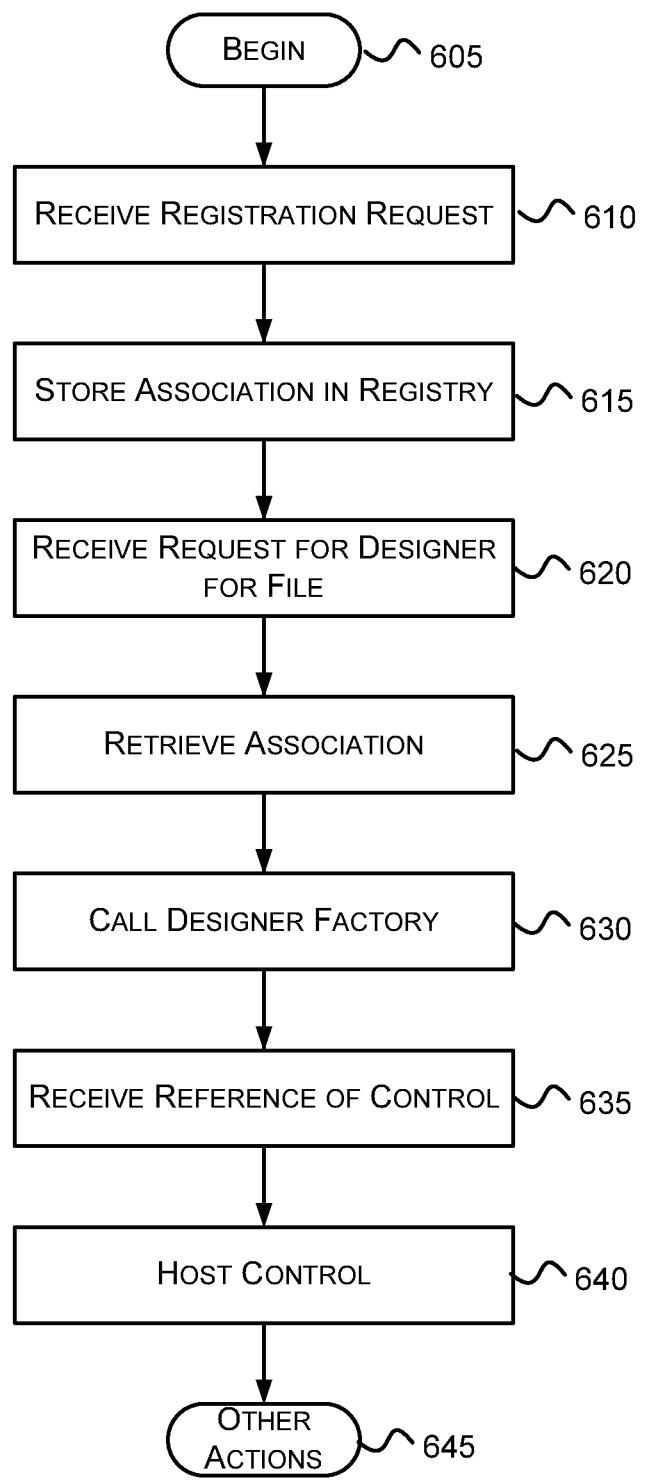

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, a designer package is registered with a development tool. For example, referring to FIG. 2, the designer package 210 is registered with a development tool. Using the wild card registration for file extensions, the registering of the designer package 210 configures the development tool to call the designer factory 220 for a file with any extension.

At block 515 a request to provide a designer for a file is received. For example, referring to FIG. 3, the designer manager receives a request for a designer supporting a file named features.xml.

At block 520, a search is performed to locate one or more designers that support the file. For example, referring to FIG. 2, the designer factory 220 may request a collection of designer providers registered with the development tool. In response, the designer factory 220 may receive a collection that includes the designer providers 225-227. The designer factory 220 then queries each of the designer providers 225-227 for designer providers that support the file. The designer providers 225-227 search the designer repository 230 to find designers that support the file.

As mentioned previously, a designer provider may determine whether a designer supports a file by comparing metadata associated with the designer with metadata or data of the file. Three examples of this include comparing the metadata with an extension of the file, comparing the metadata with a namespace (e.g., an XML or other namespace) of the file, and comparing the metadata with content of the file.

The examples above are not intended to be all-inclusive or exhaustive of the mechanisms by which a designer provider may determine whether a designer supports a file. Based on the teachings herein, those skilled in the art may recognize other mechanism by which a designer provider may determine whether a designer support a file.

At block 525, if one or more designers are found that support the file, a control is created that includes the one or more designers. For example, referring to FIGS. 3-4, the designer manager 315 may create a control 400 that includes three designers and a markup language editor where each of the three designers are associated with a different tab element (e.g., one of the tab elements 415-417), and the editor is associated with yet a different tab element (e.g., the tab element 418).

At block 530, a buffer/markup component is loaded with the file content. For example, referring to FIG. 3, the designer manager 315 may load a buffer/markup component with content of a file. As mentioned previously, the markup component may present the buffer via a model of a markup language. The markup component is operable to maintain content of the buffer in a manner that is well-formed for the markup language. After the buffer/markup component is loaded with the file content, a reference to the buffer/markup component may be passed to each of the designers that are in the control.

At block 535, a reference to the control is passed to the development tool. For example, referring to FIG. 3, the designer manager may pass a reference to a development tool which may then use the control hoster 340 to host the control.

Some other actions that may occur before or after the one or more of the actions above include:

1. Searching a collection of one or more binders that associate designers with items;

2. Finding, in the collection, a binder that associates a designer with an item currently loaded in the software development tool;

3. Configuring a user interface element associated with the item to provide an indication to open the designer in response to input regarding the user interface element; and 4. In response to the indication to open the designer, returning to the software development tool, via a designer factory, a reference to a control that includes the designer.

In the case of a tool window, some exemplary additional actions may include registering the tool window with the software development tool where the tool window is not associated with any file. This registering may include exporting as metadata associated with the tool window an identifier of the tool window. This identifier may then be usable to find the tool window in a designer repository.

At block 540, other actions, if any, may be performed. For example, the development tool may host the control and allow a user to interact with the tool.

Turning to FIG. 6, at block 605, the actions begin. At block 610, a registration request is received. The registration request may include an identifier of a designer package and an indication that the designer package is to be associated with files having any extensions. For example, referring to FIG. 3, the registry manager 325 may receive a request to register a designer package together with an indication that the designer package is to be associated with files having any extension.

At block 615, an association between the designer package and the extensions is stored in a registry. For example, referring to FIG. 2, the association may be stored as the first entry in the registry 205.

At block 620, a request for a designer for a file is received. For example, referring to FIG. 3, the user interface 335 may receive an indication that a software developer wants to open an identified file.

At block 625, the association is retrieved from the registry. For example, referring to FIG. 2, the association to the designer package 210 may be retrieved from the registry 205.

At block 630, the designer factory of the designer package is called to obtain a control that includes one or more designers that support the indicated file. For example, referring to FIG. 2, the designer factory 220 is called and provided with an indication of a file. The designer factory 220 determines the designers that support the indicated file and creates the designer control 215 that includes the designers that support the file. The designer factory 220 then returns a reference to the control to the development tool.

At block 635, the reference to the control is received at the development tool. For example, referring to FIG. 3, the reference is received at the control hoster 340.

At block 640, the control is hosted in a window of the software development tool. For example, referring to FIG. 3, the control hoster 340 may host the control in a window so that a user may interact with the designers of the control.

At block 645, other actions, if any, may be performed.

As can be seen from the foregoing detailed description, aspects have been described related to designer extensibility. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   registering a designer package with a software development tool, the registering configuring the software development tool to call a designer factory of the designer package to request a designer;
   receiving, from the software development tool, a request to provide a designer for an indicated file;
   searching for one or more designers, from a plurality of designers, that support the indicated file;
   in response to a determination that said searching results in the one or more designers being found:
      creating, via the designer factory, a control that includes the one or more designers that support the indicated file; and
      providing to the software development tool a reference to the control; and
   in response to a determination that said searching results in the one or more designers not being found, returning a code to the software development tool that indicates that the designer factory is unable to find the one or more designers.

2. The method of claim 1, wherein creating a control that includes the one or more designers comprises creating a control that includes a tab element for each of the one or more designers, the tab element operable to receive a command to switch to a designer associated with the tab element.

3. The method of claim 2, wherein creating the control that includes the one or more designers further comprises creating a control that includes an additional tab element, the additional tab element associated with a markup language editor included in the control, the additional tab element operable to receive a command to switch to the markup language editor.

4. The method of claim 1, further comprising loading a buffer with content of the indicated file and providing a reference to the buffer to the one or more designers included in the control.

5. The method of claim 4, wherein loading a buffer with content of the indicated file comprises loading the content into a markup component that presents the buffer via a model of a markup language, the markup component operable to maintain content of the buffer in a manner that is well-formed for the markup language, and wherein providing a reference to the buffer to the one or more designers included in the control comprises passing a reference to the markup component.

6. The method of claim 1, wherein searching for one or more designers that support the indicated file comprises:
   requesting a collection of designer providers registered with the software development tool; and
   querying the designer providers in the collection for any designers that support the indicated file.

7. The method of claim 6, further comprising determining, by a designer provider, whether a given designer supports the indicated file by comparing metadata associated with the given designer with an extension of the file.

8. The method of claim 6, further comprising determining, by a designer provider, whether a given designer supports the indicated file by comparing a namespace associated with the given designer with a namespace associated with the indicated file.

9. The method of claim 6, further comprising determining, by a designer provider, whether a given designer supports the indicated file by comparing content associated with the given designer with content of the indicated file.

10. The method of claim 1, further comprising:
    searching a collection of one or more binders that associate designers with items;
    finding, in the collection, a binder that associates one of the designers with an item currently loaded in the software development tool;
    configuring a user interface element associated with the item to provide an indication to open the one of the designers in response to input regarding the user interface element; and in response to the indication, returning to the software development tool, via a designer factory, a reference to a control that includes the one of the designers.

11. The method of claim 1, further comprising registering a tool window with the software development tool, the tool window not associated with any file, the registering of the tool window comprising exporting as metadata an identifier of the tool window, the identifier usable to find the tool window in a designer repository.

12. In a computing environment, a system, comprising:
one or more stores that include a registry that includes one or more entries, the entries associating file extensions with designer packages;
a designer package that includes a designer factory that references one or more designer providers, the one or more designer providers operable to determine whether one or more designers of a plurality of designers support a file having an extension, the designer factory operable to create a control that includes the one or more designers in response to determining that the one or more designers support the file having the extension;
a registry manager operable to receive an indication of the designer package together with an indication that the designer package is to be associated with all extensions, the registry manager further operable to create an entry within the registry that associates the designer package with the all extensions; and
a designer manager operable to receive a request to edit an indicated file having an indicated extension, to determine the designer package using the registry manager, and to call the designer factory to create the control that includes the one or more designers that support the indicated file in response to a determination that the one or more designers support the indicated file, the designer factory being configured to return a code that indicates that the designer factory is unable to find the one or more designers in response to a determination that the one or more designers do not support the indicated file.

13. The system of claim 12, wherein the designer package extends a software development tool to support designers not originally included in the software development tool.

14. The system of claim 12, wherein the designer factory being operable to create a control that includes the one or more designers comprises the designer factory being operable to create a control that includes a tab element for each of the one or more designers, the tab element operable to receive a command to switch to a designer associated with the tab element.

15. The system of claim 12, wherein the designer factory being operable to create a control that includes the one or more designers comprises the designer factory being operable to include an additional tab element in the control, the additional tab element associated with a markup language editor included in the control, the additional tab element operable to receive a command to switch to the markup language editor.

16. The system of claim 12, wherein the designer factory is further operable to load a buffer with content of the indicated file and to provide a reference to the buffer to the one or more designers included in the control.

17. The system of claim 12, wherein the one or more designer providers being operable to determine one or more designers that support a file having an extension comprises the one or more designer providers being operable to perform actions, comprising:
comparing the extension to extension metadata associated with the one or more designers;
comparing a namespace of the file to namespace metadata associated with the one or more designer providers; and
comparing content of the file with content metadata associated with the one or more designer providers.

18. A computer storage medium having computer-executable instructions, which when executed perform actions, comprising:
receiving a registration request for a designer package, the registration request including an identifier of the designer package and an indication that the designer package is to be associated with files having any extensions;
storing an association between the designer package and the extensions in a registry;
receiving a request for a designer associated with an indicated file having an indicated extension;
searching for one or more designers, from a plurality of designers, that support the indicated file;
in response to a determination that said searching results in the one or more designers being found:
retrieving the association from the registry;
calling a designer factory of the designer package to obtain a control that includes one or more designers that support the indicated file;
receiving a reference to the control;
hosting the control in a window of a software development tool;
creating, via the designer factory, a control that includes the one or more designers that support the indicated file; and
providing to the software development tool a reference to the control; and
in response to a determination that said searching results in the one or more designers not being found, returning a code to the software development tool that indicates that the one or more designers cannot be found.

19. The computer storage medium of claim 18, wherein receiving a reference to the control comprises receiving a reference to a control that has a tab element for each of the one or more designers and further comprising receiving input via one of the tab elements, the input representing a command to switch to a designer associated with the one of the tab elements.

20. The computer storage medium of claim 18, wherein receiving a reference to a control includes receiving a reference to a control that includes a markup language editor in addition to the one or more designers that support the indicated file, the markup language editor operable to edit markup language corresponding to content of the indicated file.

* * * * *